252. COMPOSITIONS,

Patented Sept. 15, 1942

UNITED STATES PATENT OFFICE 2,296,121

GERMICIDAL SOAP

James A. Smith, Philadelphia, Pa.

No Drawing. Application June 19, 1939,
Serial No. 279,912

4 Claims. (Cl. 252—107)

The object of the invention is to provide an improved soap, but more particularly improvements in soap which is germ killing in conformity with standards established by the United States Food and Drug Administration.

Another object is to provide germ killing soap, which fully meets the requirements of and within the limits set by the American Medical Association, that is, as being not harmfully irritating to the skin, the body tissues and the mucous membranes, while yet potent enough to kill all forms of bacteria of a resident or transient character.

A further object is to provide a soap and/or detergent of this nature which contains up to 20% moisture or one which is wholly or as nearly anhydrous as it is possible to make it. Chlorine, some of its inorganic salts, and some organic compounds of chlorine are the most potent of the suitable germ killing substances of the halogen group of chemical elements and their compounds because their available chlorine is readily releasable by water in dilute solutions and in the presence of bacteria from the particular type of compounds, hereinafter selected and described for this purpose.

Still another object of the invention is to provide improved germ killing hard or soft soaps and/or detergents, and more specifically any and all mixtures of substances ordinarily used as soaps or detergents, or both, which can be blended in an anhydrous condition or in a condition including up to 20% moisture with germ killing agents hereinafter set forth, and comprising chlorine-carrying salts from which the chlorine content is released when in contact with water; also, in one embodiment to blend such anhydrous or hydrous hard and soft soaps, in order to produce a soft, creamy product.

And a still further and more specific object is to provide a substantially physiologically neutral germ killing soap, comprising the combination of a composite hard and soft soap, with finely divided crystals of sodium paratoluenesulfonchloramide, hereinafter generally referred to as Chloramine-T, paratoluenesulfondichloramide, hereafter generally referred to as Di-chloramine-T, sodium benzenesulphonchloramide, hereinafter generally referred to as Chloramine-B, paratoluosulfondichloramino benzoic acid, calcium hypochlorite, or any other suitable chloramine or chlorine-liberating substance, in such strength as to release from 11.5% to 13.0% of chlorine by weight of the total Chloramine-T, or from 28% to 30% of chlorine by weight of the total Di-chloramine-T when used, or from 13% to 14.5% of chlorine by weight of the total Chloramine-B when it is used, or from 25% to 27% of chlorine by weight of the total Halazone when it is used, or 68% to 70% of the total weight of calcium hypochlorite when it is used, or in other words not more than such a percentage as is necessary to kill or destroy bacterial life, or in other words approximately 0.0833% to 4.9% by weight of the total bulk of the soap.

Chlorine and its sources

In producing this soap, chlorine and some of its salts and compounds, were selected as the best group of substances, all things considered, as they are the strongest and most suitable germ killing agents, of the halogen group of chemical elements, and can be obtained in various compounds, which in the absence of water and in the presence of water in some cases maintain their chlorine in stable form, as long as may be necessary, that is, until it is desired to use the soap for cleaning and/or for germ killing purposes.

Referring to "Textbook of Bacteriology" by Zinsser and Bayne-Jones, among the various sources of chlorine, chloride of lime is probably a single compound with the formula $Ca(OCl)_2$. The action of acids or even of atmospheric carbon dioxide upon this substance results in the libration of chlorine, as for instance:

$$Ca(OCl)_2 + 2HCl \rightarrow CaCl_2 + 2HOCl$$

$$2HOCl + 2HCl \rightarrow 2H_2O + 2Cl_2$$

Hypochlorous acid may also decompose with the liberation of oxygen, as shown in the following equation:

$$2HClO \rightarrow 2HCl + O_2$$

It is conceivable that some of the disinfecting value of chloride of lime and hypochlorites in general is really due to the vigorous oxidizing action resulting from this decomposition. On the other hand, there is much evidence to show that chlorine may attack the protein molecule directly by replacing "H" in the amino groups, thus:

$$-R-CONH-R- + Cl \rightarrow R-CONCL-R + H$$

in which R is any alkyl or aryl radical.

The chloramines thus formed seem to be toxic and result in the death of the bacteria.

Bleaching powder is readily soluble in about twenty parts of water. Its bactericidal action depends on the hypochlorous acid formed. After water precipitation, an efficient dosage is ten pounds to the million gallons. The high germicidal action of chloride of lime, together with its relatively low cost, suggested its use as a wound dressing. Solutions of calcium or sodium hypochlorite were found to be too irritating to be practicable, owing to the alkalinity of any available preparations. It has been possible to prepare neutral and comparatively non-irritating solutions of sodium hypochlorite by several different methods.

The chlorine antiseptics in general, and particularly the hypochlorite type, have the disadvantage of exerting their disinfectant action over an exceedingly short space of time. The reaction between the hypochlorite solution and the proteins of the bacterial body or of the serum and pus in the wound, is almost instantaneous, and having taken place, no further toxic action is shown. It is, therefore, necessary in treating wounds with these solutions to repeat the application at frequent intervals, or else to supply through some sort of a continuous feeding apparatus, so that a fresh supply of the antiseptic is brought into contact with the wound at short intervals.

In order to overcome this disadvantage to some extent, Dakin prepared a number of different organic chlorine compounds which were soluble in oil and in water, and which yielded up the chlorine rather slowly to the wound secretions, so that the action continued over a comparatively long time. Chloramine-T (Fig. 1) and Di-chloramine-T (Fig. 2) are the two most practicable compounds; these substances have the following formulae:

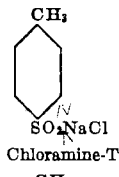

Fig. 1

Chloramine-T

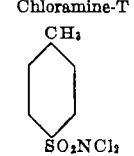

Fig. 2

Di-chloramine-T

They contain chlorine-replacing hydrogen in an amino group, and this chlorine is liberated slowly, in contact with protein material. They are used in solution in oil, either chlorinated paraffin oil, or oil of eucalyptol, and are applied as a spray or on gauze.

While there are numerous such sources of chlorine, the source preferred is that of the mona sodium derivative of the sulphonic acid group in the para position, commonly known as sodium paratoluenesuphonchloramide, comprising one of the aromatic sulphonchloramides, represented by the formula $C_6H_4(CH_3)NSO_2NaCl.3H_2O$, or

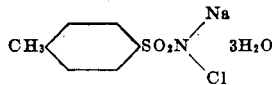

This substance, known as Chloramine-T, liberates in water 11.5% to 13.0% active chlorine, the last-mentioned amount being the approximate theoretical limit.

Dichloramine-T, another aromatic sulphonchloramide and also a compound of the toluene sulphonic acids, and represented by the formula $(CH_3)C_6H_4SO_2NCl_2$, and known as paratoluenesulphondichloramide, liberates from 28.0% to 30.0% active chlorine, but is almost insoluble in water, and liberates its chlorine but very slowly when mixed in chlorinated paraffin wax and the vegetable oils. There is also Chloramine-B, which is defined as sodium benzenesulphonchloramide, represented by the formula

$C_6H_5SO_2NNaCl\ 2H_2O$, which in water liberates from 13% to 14.5% active chlorine, and Halazone which is defined as paratoluolsulphondichloramino benzoic acid, represented by the formula

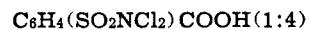

$C_6H_4(SO_2NCl_2)COOH(1:4)$

Of all these sulphonchloramides, the compound, sodium paratoluenesulphonchloramide, has been found by exhaustive experiments to offer the nearest approach to an absolutely perfect product when compounded with soaps, that can be used to insure the liberation of chlorine and its germ killing salts in water, excepting only pure chlorine gas when produced as such.

The special advantage of using a water-soluble aromatic sulphonchloramide, such as Chloramine-T or Chloramine-B, resides in the fact that it can be incorporated in an anhydrous or hydrous soap and thereby maintained relatively stable, while upon coming into contact with water, it immediately releases free chlorine or its germ killing salts directly upon the surface, which is intended to be cleansed and disinfected.

It is apparently true that chlorine acts as a germ killer by reason of its tremendous affinity for hydrogen, thereby liberating nascent oxygen which in turn functions as a cleanser and a germ killer, but it is generally accepted that the disinfecting power of the hypochlorites is not due directly to the free chlorine or hypochlorous acid present, but to a loosely bound combination of such chlorine or chlorine compounds with protein matter. Furthermore, the chlorine itself apparently changes the surface tension of all living animal and vegetable cells, and probably changes the pH concentration, while stealing the hydrogen and simultaneously liberating oxygen, which thereby forms a highly destructive physical and chemical condition that is inimical to all bacterial life when compounded with soaps.

Saponification

It is generally recognized that soap, being made with sodium and/or potassium hydroxide reacting with the oils, fats or waxes containing the higher fatty acids, as for example stearin, palmitin and olein, as a cleanser, is always more or less irritating to the skin and mucous membrane, since a certain amount of free alkali, which is the active agent in the removal of foreign matter, has always heretofore been present when soap is in solution.

By contrast, the present soap is blended with a sulphon chloramide such as Chloramine-T, so that the Chloramine-T is inactive until it is exposed to and in contact with water, but as chlorine has a high affinity for sodium and potassium, it combines with these ingredients of the soap (when both are used; otherwise, with the one that is present) and thereby minimizes the irritating effect to such a degree, that if the proper balance or proportion is employed, no more than a minimum amount of irritation is produced.

Thus far it is uncertain exactly what combination is formed between the chlorine liberated and the sodium and potassium salts of the higher fatty acids, but it is known that the fatty acids present definitely enter into the resulting combination. It has been ascertained that when chlorine is liberated in a watery solution of the improved soap from 0.2% to 0.36% chlorine by weight kills within six to thirty seconds all organisms present, whether pathogenic or otherwise. The proportion of chlorine-carrying substance may be such as to result in the liberation of as high as 4.9% chlorine, if such is desired for any particular purpose, but the limits first mentioned as available in the United States Pharmacopoeia for Chloramine-T are effective.

The tests conducted and with which positive results were obtained are those set forth as standard by the authority mentioned in accordance with the phenol coefficient and using bacillus typhosus (Eberthella, Hopkins strain) and staphlococcus sureus in a 22–26 hour culture, incubated and grown in nutrient broth.

As before stated, the soap can be made with either a hard or soft soap base, but is preferably compounded and used with both hard and soft soap bases as a composite soap of any desired consistency, such as cream, liquid, cake, or powder. It is a strong deodorant when sufficient sodium paratoluenesulfonchloramide is used to liberate 0.3% to 1.0% free or available chlorine. It is slightly bleaching in action.

The following, 1 and 2, can be typical formulae for the soap in cream form, the weights given being obviously for only small quantities of the soap, and therefore, being purely illustrative:

1. Hard soap.

50 cc. of cottonseed oil
100 cc. of 100% (as nearly anhydrous as commercially possible) ethyl alcohol
15 cc. or its equivalent of sodium hydroxide (40% solution) in 100% alcohol (as nearly anhydrous as commercially possible)

2. Soft soap.

50 cc. of cottonseed oil
100 cc. of 100% (as nearly anhydrous as commercially possible) ethyl alcohol
21 cc. or its equivalent of potassium hydroxide (40% solution) in 100% alcohol (as nearly anhydrous as commercially possible)

Each of these compounds is reacted by heat in a 500 cc. Erlenmeyer flask under an air or water cooled reflux condenser.

These two formulas are preferably blended together, after the alcohol is recovered by ordinary solvent removal or recovery methods such as evaporation or distillation, with the result that a cream-colored, medium-hard soap is produced, with a consistency suitable for dispensing from a collapsible metallic tube. A suitable quantity of the sodium paratoluenesulphonchloramide is then added to provide Chloramine-T in such proportion that, when the soap is added to a measured quantity of water, it will result in a solution of 0.2% to 1.0% of Chloramine-T in the water, thereby liberating approximately 12.5% of 0.3% or 12.5% of 1.0% of free chlorine, respectively.

3. Inventor's soap.

Inventor's soap is a mixture, the active ingredient of the cake is Chloramine-T 7%. The vehicle is a standard toilet soap containing an average of 8% to 10% or as much as 20% moisture, and 5% mineral oil. No preservatives for the Chloramine-T are present with the exception that the Chloramine-T is mixed with mineral oil before the soap is processed.

If desired, the improved, germ killing soap may be made in cream form with the following formulae, and as illustrative of such form of soap the following illustrations are given:

1. 
|  | Grams |
| --- | --- |
| 4.5% Recrystallized calcium hypochlorite | 4.5 |
| 37.7% Heavy petrolatum | 37.7 |
| 57.8% Anhydrous soap | 57.8 |

This formula results in a cream soap that releases chlorine slowly over a relatively long period of time.

2. 
|  | Grams |
| --- | --- |
| 6.72% Recrystallized calcium hypochlorite | 18 |
| 39.2% Hydrogenated fat | 105 |
| 2.24% Pine oil (chlorinated) | 6 |
| 51.84% Soap (anhydrous) | 139 |

This cream soap is characterized by the extent to which it lathers.

3. 
|  | Grams |
| --- | --- |
| 6% Recrystallized calcium hypochlorite | 18 |
| 8% Light petrolatum | 24 |
| 28% Hydrogenated fat | 84 |
| 4% Talc | 12 |
| 3% Pine oil (chlorinated) | 9 |
| 50% Anhydrous soap | 150 |
| 1% Boric acid | 3 |

This cream soap both lathers well and is characterized by a longer period of action, but is also adapted for use upon body surfaces.

4. 
|  | Grams |
| --- | --- |
| 8% Recrystallized calcium hypochlorite | 24 |
| 29.3% Light petrolatum | 88 |
| 62% Anhydrous soap | 186 |
| .666% Pine oil | 2 |

This formula results in a cream soap which releases chlorine slower and over a longer period than any that can be readily obtainable commercially.

5. 
|  | Grams |
| --- | --- |
| 17.5 Heavy Petrolatum | 52.5 |
| 3% Pine oil (chlorinated) | 9 |
| 3% Talc | 9 |
| 1% Boric acid | 3 |
| 6% Recrystallized calcium hypochlorite | 18 |
| 52% Anhydrous soap | 156 |

This formula provides a cream soap which is about equally adapted for use upon the body surfaces and the membranes of the body as well.

6. 
|  | Grams |
| --- | --- |
| 38% Olive oil (chlorinated) | 760 |
| 4% Heavy petrolatum | 80 |
| 8% Recrystallized calcium hypochlorite | 160 |
| 49% Anhydrous soap | 980 |
| 1% Pine oil (chlorinated) | 20 |

The cream soap resulting from this formula is perhaps the best balanced for use interchangeably upon body surfaces and membranes.

7. Method of Manufacture.

The soap base is manufactured by the standard full-boiled process, from sodium hydroxide and saponifiable fat. The settled soap is dried to 8%–10% moisture content, then it is "French-milled" and pressed into cakes. The Chloramine-T and mineral oil are incorporated during the milling process.

However, in any case it is to be understood that the invention is in no wise to be limited to the details of the foregoing formula, as the same is presented solely for purposes of illustration.

If a complete sodium cream soap is desired, as for example a sodium salt of any higher fatty acid, a sodium anhydrous soap can be made as hereinbefore mentioned, ground and milled to a finely divided state, super-fatted with a saponifiable completely saturated higher fatty acid, or a saturated hydrocarbon oil ($C_nH_{2n+2}$), chlorinated with any of the herein described germ killing substances and produced in any desired consistency, as herein described.

Any one of several saponifiable oils, fats and waxes can be used to produce the physical state of the soap desired, such for instance as olive, castor, corn, cottonseed, soya bean, linseed, palm and similar oils, lard, tallow, mutton, lanolin and similar fats, and palm, carnauba, gandang, Japanese, myrtle and similar waxes. If such oils, fats and waxes are unsaturated as to their carbon bond, they can be saturated with one of the halogen elements, preferably chlorine, or hydrogen, so as to thereby prevent the oil, fat or wax present from absorbing the antisepticizing agent.

Germ killing soap and its uses

Either the hard or the soft soap may be used separately, the procedure for adding the aromatic sulphonchloramide being the same in any case, and the addition of the drying agent, if such be used, follows the procedure outlined below.

If a mixture of hard and soft soap is to be made commercially, it is preferable to saponify the oil with a mixture of alcoholic potash and soda, the proportions of the potash and soda being varied to determine the proportions of soft and hard soap desired in the resultant product. Furthermore, other solvents than ethyl alcohol can be used for the saponification, examples of such other solvents being methyl alcohol, xylene, benzene and benzine, or mixtures of the same, but such alternative solvents should of course be substantially anhydrous, while other fatty oils such as olive oil, cocoanut oil, lard, etc., may be used in making the improved soap.

Probably the best proportion of Chloramine-T, in order to provide an apparent coefficient, ranging from ten to forty times the minimum required by the standards mentioned, depending upon the organisms tested, is seven percent (7%) by weight of the final soap mass, while it has also been found that the presence of approximately 1% (1%) of magnesium carbonate aids in preserving the essentially substantially anhydrous characteristic, also the physiological and chemical reaction of the improved soap on skin and mucous membranes. Thus, a soap product containing this additional ingredient will comprise substantially 96% soap, 3% Chloramine-T and 1% magnesium carbonate; otherwise, about 97% soap and about 3% Chloramine-T. Such a soap will withstand temperatures of 55° to 60° C. for considerable periods, and can contain as much as approximately from 0.33% to 20% water, without losing sufficient free chlorine to become ineffective, and still contain about fifteen times the required minimum of the Chloramine-T. If calcium hypochlorite is used in lieu of Chloramine-T, the percentage of moisture in the soap must be similarly approximately 0.33%, but may vary from zero to the neighborhood of 20%.

In using the improved soap in any of the several forms in which it may be employed, it is dissolved or dispersed in or brought into contact with water, which then uses varying quantities of the composite soap, thereupon immediately releasing sufficient free chlorine and/or hypochlorite to kill all types of bacteria, in accordance with the standards set forth by the United States Food and Drug Administration hereinbefore referred to, and as required by the American Medical Association in order to describe or define a substance of this nature as being germ killing in accordance with a strict interpretation of that term.

One highly satisfactory form of cake in which the improved soap can be marketed is, for example, a block of sixteen or other suitable number of sections, aggregating two ounces, and the entire block or cake containing such quantities of Chloramine-T, or substitute therefor, as will, when one of said sections is completely dissolved in four ounces of water, produce in six seconds a true antiseptic solution.

In the foregoing exposition of the improved antiseptic soap, the Chloramine-T, Di-chloramine-T and Halazone, while highly efficacious are relatively quite expensive, even when produced by the best methods known today. Therefore, a substitute has been sought and found in calcium hypochlorite, which is obtained by first producing calcium hypochlorite by chlorinating milk of lime and then evaporating the resultant compound in a vacuum. Dehydration of the crystals gives a very stable powder, containing 80% to 90% chlorine, as compared with 35% of chlorine obtainable in chloride of lime.

Mixtures of calcium hypochlorite as a source of or carrier for chlorine have been made in the proportions of from 1% crystallized calcium hypochlorite and 99% soap to 7% crystallized calcium hypochlorite and 93% soap, the 4% crystallized calcium hypochlorite and 96% soap comprising apparently the lethal point of the solution.

It has been found that a 2% solution of the soap contains (titrating by the U. S. P. method of analysis) a total chlorine content equivalent to 0.42 to 0.45 cc. of $N/10$ $Na_2S_2O_3$ for every 5 cc. of the said solution and is then lethal to *B. typhosus* and *Staph. aur.* in 30 seconds or less.

In order to maintain the product commercially anhydrous, i. e., containing less than 1% moisture—actually about 0.33% by analysis—1% magnesium carbonate has been combined with each proportion of from 1% crystallized calcium hypochlorite and 98% soap to 7% crystallized calcium hypochlorite and 92% soap, the proportion containing 4% crystallized calcium hypochlorite still apparently being the lethal point of the solution.

Another admirable compound is produced by using 2% anhydrous sodium carbonate and 1% magnesium carbonate, together with from 1% crystallized calcium hypochlorite and 96% soap to 7% crystallized calcium hypochlorite and 91% soap, the 4% crystallized calcium hypochlorite proportion still representing the lethal point of the solution. Using soaps represented by this last group results in the production of a sodium salt in the solution, whereas if calcium carbonate were used, this would be washed out.

Finally, a series of combinations has been prepared, using 2% anhydrous sodium carbonate with from 1% crystallized calcium hypochlorite and 97% soap to 7% crystallized calcium hypochlorite and 92% soap, the lethal point still being the 4% crystallized calcium hypochlorite compound. In this last series, 1% to 6% of the soap was later replaced by the same quantities of sodium perborate, without changing the amounts of anhydrous sodium carbonate and crystallized calcium hypochlorite, the sodium perborate serving as a buffer.

The invention in its broad scope is intended to cover (1) all mixtures of anhydrous or hydrous soap containing magnesium sulphate, chlorinated lime and sodium perborate; (2) all mixtures of soap containing chlorinated lime, sodium perborate and sodium carbonate; (3) all mixtures of soap containing Halazone, sodium chloride, sodium carbonate and magnesium carbonate; (4) all mixtures of soap containing chloramines, (—R.COClN.R—) chloramine and anhydrous or hydrous soaps; (5) all mixtures of soap containing hypochlorite of lime, sodium carbonate and sodium bicarbonate; (6) all mixtures of soap containing chlorinated lime, sodium carbonate and sodium perborate; (7) all mixtures containing any of the foregoing, together with higher fatty acids in sufficient quantity to cut down free alkalinity and aid in lathering; (8) and all mixtures containing any or all of the above ingredients, together with an oleate of similar percentage and in place of the soap included in each of the examples given substantially as follows:—

1. An example of the first combination given, the proportions being approximate, comprises 73% anhydrous or hydrous soap, 2% magnesium sulphate, 12½% chlorinated lime, and 12½% sodium perborate.

2. An example of the second combination given, the proportions being approximate, comprises 62½% soap, 12½% chlorinated lime, 12½% sodium perborate, and 12½% anhydrous sodium carbonate.

3. An example of the third combination given, the proportions being approximate, comprises 96% to 91% anhydrous or hydrous soap, 1% to 6% Halazone, 1% sodium chloride, 1% sodium carbonate and 1% magnesium carbonate.

4. An example of the fourth combination given, the proportions being approximate, comprises 94% to 99% anhydrous or hydrous soap and 6% to 1% (R.COClN.R) chloramines.

5. An example of the fifth combination given, the proportions being approximate, comprises 62½% anhydrous or hydrous soap, 12½% hypochlorite of lime, 12½% sodium bicarbonate.

6. An example of the sixth combination given, the proportions being approximate, comprises 62½% anhydrous or hydrous soap, 12½% chlorinated lime; 12½% sodium carbonate, and 12½% sodium perborate.

Having a soap prepared in accordance with the herein described invention, it can be formed into cakes in the following manner: The soap is first ground into particles of substantially uniform size, and then intimately associated with from 1% to 10% of mineral oil or from 1% to 12% talc or from 1% to 10% of mineral oil and talc combined. In the case of oil being used, the same is atomized and sprayed so that each individual particle of soap is fully covered, while with the talc a homogeneous mixture is insured. With the ground soap particles thus treated, they are pressed between suitable dies in any desired manner, and it has been found that this treatment of the soap adds to the maintenance of its initial anhydrous nature (if the anhydrous characteristic is desired), it being understood that the term soap in this statement is employed in its broadest concept, as defined by the description of the same in this specification. It is also to be understood that the recrystallized calcium hypochlorite and the other active antiseptics may be added to the mineral oil, and thereby to the soap when produced in cake form, instead of previous to the treatment with oil, as when forming an anhydrous or hydrous soap of other than cake form.

The improved soap mixture may also be pressed into standard cakes or tablets weighing 2.59 grams or an even multiple thereof, as for example 5.18 grams; or in wafers of the same weight or a multiple thereof, so that when dispensed in water or totally dissolved in water each weight, 2.59 grams in 4½ ounces (129½ cc.), will produce approximately a 2% solution; or it may be pressed in any suitable cake form, and the cake so scored that, when severed along such scoring section, the separated section when dissolved in a stated amount of water will produce a 2% solution. As an aid in pressing the soap into cake form, a suitable method involves plating a steel die with copper, while approximately 10% mercuric nitrate is rubbed upon the die faces to produce a mercury amalgam, which prevents the cake from sticking to the press. However, the efficacy of the soap per se is not dependent upon this method, wherefore no claim is made to the latter herein.

It is believed that in solution an oxychloride is developed as shown in the following equation:

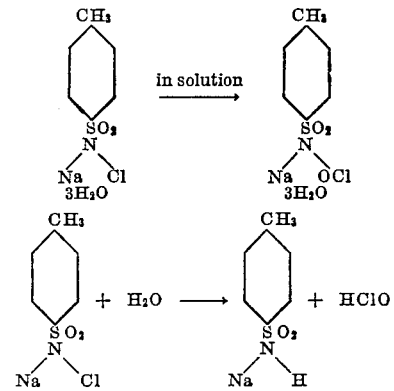

Furthermore, by the addition of any compatible weak acid or its water soluble salt, such as lactic, boric or acetic acids, etc., the soap may be made more nearly neutral, i. e., its pH is lowered toward 7, in order that the resulting solution becomes more applicable to cut epithelia.

Having thus described my invention, what I claim as new and desire to protect by Letters Patent of the United States is:

1. A germicidal soap composition comprising the combination of a soap base having a moisture content within the range of 0.3% to 20% with finely divided crystals of an aromatic sulphon chloramide selected from the group consisting of Chloramine-T Chloramine-B and D-chloramine-T dispersed throughout the soap, said aromatic sulphon chloramide crystals being coated with mineral oil and being in such proportion as to release from 11.5% to 13% of chlorine by weight thereof when Chloramine-T is used, from 13% to 14.5% of chlorine by weight thereof when Chloramine-B is used, and from 28% to 30% of chlorine by weight thereof when Di-chloramine-T is used, when the composition is in contact with water.

2. A germicidal soap composition comprising the combination of a soap base having a moisture content within the range of 0.3% to 20% with finely divided crystals of Chloramine-T dispersed throughout the soap, said Chloramine-T crystals being coated with mineral oil and being in such proportion as to release from 11.5% to 13% of chlorine by weight thereof, when the composition is in contact with water.

3. A germicidal soap composition comprising the combination of a soap base having a moisture content within the range of 0.3% to 20% with finely divided crystals of Chloramine-B dispersed throughout the soap, said Chloramine-B crystals being coated with mineral oil and being in such proportion as to release from 13% to 14.5% of chlorine by weight thereof, when the composition is in contact with water.

4. A germicidal soap composition comprising the combination of a soap base having a moisture content within the range of 0.3% to 20% with finely divided crystals of Di-chloramine-T dispersed throughout the soap, said Di-chloramine-T crystals being coated with mineral oil and being in such proportion as to release from 28% to 30% of chlorine by weight thereof, when the composition is in contact with water.

JAMES A. SMITH.